Jan. 10, 1928.
F. S. CARR
1,656,040
FASTENER
Filed July 22, 1925
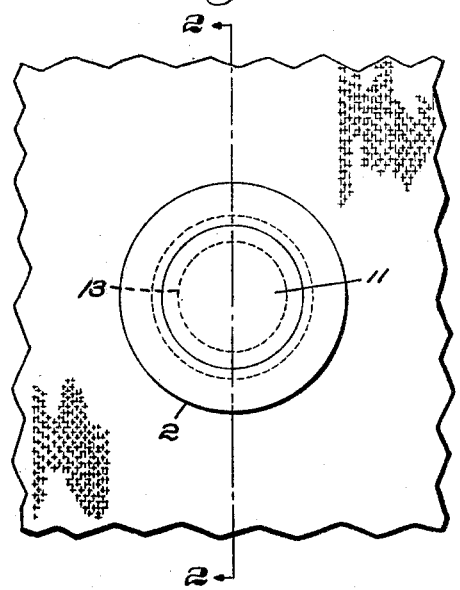
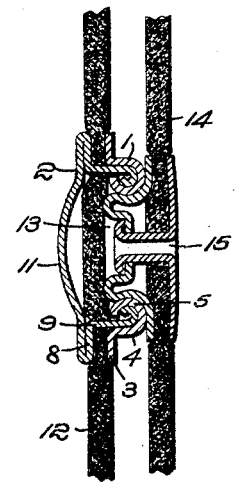
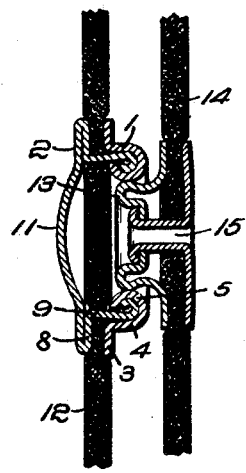
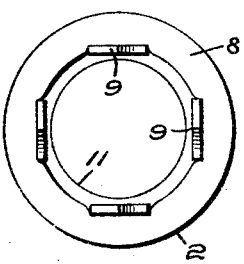
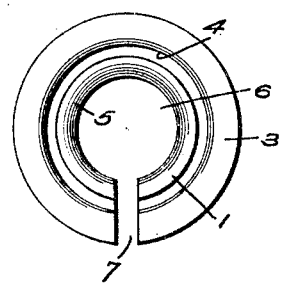
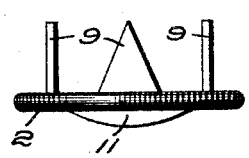
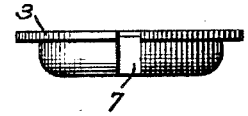
Inventor:
Fred S. Carr,
by Emery Booth Janney-Varney
Attys Patented Jan. 10, 1928.

1,656,040

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed July 22, 1925. Serial No. 45,277.

This invention aims to provide an improved snap fastener socket.

In the drawings which illustrate a preferred embodiment of my invention:

Fig. 1 is a front elevation of a fastener including the improved socket member;

Fig. 2 is a section on the line 2—2 of Fig. 1;

Fig. 3 is a section of the fastener elements showing the stud being entered in the socket;

Fig. 4 is a back view of the attaching cap;

Fig. 5 is a side view of the attaching cap;

Fig. 6 is a back view of the stud receiving member of the socket; and

Fig. 7 is an edge view of the member shown in Fig. 6.

Referring to the drawings I have illustrated a snap fastener which is particularly, though not exclusively, useful for securing two pieces of flexible material together.

The socket member is simple, inexpensive and durable and includes a stud-receiving part 1 formed from a single piece of metal and an attaching plate or cap 2 also formed from a single piece of metal. The stud-receiving part is ring-like in form having a flange portion 3, a wall 4 extending outwardly from the flange and a second wall 5 curved inwardly, upwardly and outwardly from the outer wall 4. This wall 5 is of substantial width and surrounds a stud-receiving aperture 6 for engagement with the neck of a cooperating stud. A slit 7 (Figs. 6 and 7) is provided at one side of the stud-receiving part to permit contraction and expansion thereof as a whole.

The attaching part is provided with a reversely bent flange portion 8 at its periphery, a plurality of attaching prongs 9 extending from the inner edge of the reversely bent flange portion 8 and a centrally located dome shaped portion 11.

The two parts 1 and 2 of the socket member may be secured to opposite sides of a flexible fabric 12 by pressing the prongs 9 through the fabric 12 so that they may be upset and clinched by the anvil formed by the walls 4 and 5 of the stud-receiving member 1, as best illustrated in Fig. 2.

The stud 13 may be secured to the stud-carrying fabric 14 by a rivet 15 in the usual manner, the whole being substantially as shown and described in other copending applications.

When securing the stud and socket together the head of the stud first passes into the stud-receiving aperture 6 and engages the wall 5. On continued pressure exerted upon the stud and socket the head of the stud forces its way past the wall 5 (Fig. 3) thereby expanding the entire stud-receiving part as a whole. This expansion may take place without interference from the prongs 9 which bend slightly throughout the length of the straight portions thereof without interference from the edge of the wall 5 as fully illustrated in Fig. 3. After the head of the stud passes the high point of the wall 5, the stud-receiving member 1 contracts and the wall 5 grips the neck of the stud as shown in Fig. 2. The dome shaped portion 11 provides a space between the fabric 12 and the cap 2 into which the fabric between the prongs 9 may be forced by the head of the stud so as not to interfere with engagement of the stud with the socket.

The relatively wide flanges 3 and 8 provide means for preventing cutting or tearing of the flexible fabric 12 during expansion and contraction of the stud-receiving member 1, as well as provide relatively wide fabric gripping surfaces.

The claims of this application are broad as to the attaching plate and the combination of attaching plate and fastener element and read broadly upon applicant's copending application Serial No. 45,271 filed herewith, but do not overlap the other of applicant's applications filed on the same date. None of the other applications, except Serial No. 45,271, could support the claims of this application and applicant has elected to place his broad claims to the type of attachment shown in the drawings in this application rather than in the above-mentioned application.

While I have shown and described a preferred embodiment of my invention it will be understood that changes involving omission, substitution, alteration and reversal of parts and even changes in the mode of operation may be made without departing from the scope of my invention which is best defined in the following claims.

I claim—

1. A snap fastener element comprising, in combination, a split expansible and contractible ring-like member for cooperative engagement with a cooperating fastener element, a prong receiving and prong upsetting portion presented by said ring-like member and an attaching part presenting a plurality of attaching prongs for engagement with said prong-receiving and upsetting portion to secure said ring-like member to a support without interfering with contraction and expansion of said ring-like member.

2. A snap fastener socket including a contractible and expansible split ring located at one side of a flexible carrying medium, an attaching part located at the opposite side of the carrying medium, a plurality of attaching prongs passing from said attaching part through the carrying medium and engaging a prong receiving anvil portion presented by said ring-like member for upsetting and clinching the ends of said prongs to secure said ring-like member to the carrying medium.

3. A snap fastener socket including a stud-receiving member having an outer wall and an inner wall surrounding a stud-receiving aperture, said inner wall providing means for resiliently securing said socket to a stud, both of said walls cooperating to provide prong-receiving and clenching means, a cap member located at the opposite side of a flexible carrying medium from said stud-receiving member and presenting a plurality of attaching prongs, said prongs passing through the carrying medium and upset and clinched by said walls thereby to secure said stud-receiving member to its carrying medium.

4. A snap fastener socket including a contractible and expansible split-ring stud receiving part presenting a flange portion, a prong-receiving portion and a generally curved wall of substantial width surrounding a stud-receiving aperture, an attaching plate and a plurality of attaching prongs extending from said attaching plate at points remote from the outer periphery thereof, said prongs extending through a flexible carrying medium and clinched into engagement with said prong-receiving portion thereby gripping the carrying medium between said flange portion and the portion of said plate between the prongs and the outer periphery while permitting free expansion and contraction of said split ring.

5. A snap fastener socket including a stud-receiving member presenting a stud-receiving aperture, a generally curved resilient wall of substantial width surrounding said aperture, and a cap member presenting a plurality of attaching prongs passing through a flexible carrying medium, said prongs clinched against said resilient wall to secure said stud-receiving member to the carrying medium and adapted to yield without interfering with contraction and expansion of said resilient wall.

6. A snap fastener socket including a stud-receiving part expansible and contractible as a whole, and a prong presenting an attaching plate secured to opposite sides of a flexible support, said stud-receiving part presenting a combined stud-engaging and prong-clinching wall surrounding a stud-receiving aperture.

7. A snap fastener socket installation comprising, in combination, a flexible carrying medium, a contractible and expansible stud-receiving part located at one side of the carrying medium and an attaching part located at the opposite side of the carrying medium, a plurality of attaching prongs presented by said attaching plate for securing said stud-receiving part to the fabric and cooperating flanges presented by said parts outside of said attaching prongs for providing fabric engaging surfaces to prevent tearing and cutting the fabric.

8. A snap fastener socket installation comprising, in combination, a flexible carrying medium, a one-piece stud-receiving part contractible and expansible as a whole and a one-piece cap member presenting a plurality of attaching prongs for securing said stud-receiving part and said attaching part to opposite sides of the fabric.

9. A snap fastener socket installation comprising, in combination, a flexible carrying medium, a one-piece stud-receiving part contractible and expansible as a whole and a one-piece cap member presenting a plurality of attaching prongs for securing said stud-receiving part and said attaching part to opposite sides of the fabric and a flange portion presented by each of said parts for engagement with the fabric to prevent mutilation of the fabric during expansion and contraction of said stud-receiving part.

10. An attaching part for separable fastener elements comprising a body or plate portion and a plurality of integral attaching prongs projecting from said body or plate portion at points considerably removed from the outer periphery of said body or plate portion thereby providing a portion of said body or plate portion outside of said prongs which largely prevents cutting or tearing of the support to which said attaching part may be secured when holding a fastener element in assembly with the support.

11. A one-piece separable fastener element attaching plate having a plurality of attaching prongs formed integral therewith and extending therefrom at points removed from the periphery to provide a support engaging surface between said prongs and the periphery of said plate to conceal the edges of the openings made in a support by said prongs and to prevent undue cutting and tearing of the support when stress is exerted between the support and the prongs.

12. An attaching part for fasteners comprising a cap portion, a flange portion of substantial width beneath the cap portion adjacent to the outer periphery of said cap portion and a plurality of attaching prongs extending from said attaching part adjacent to the inner edge of said flange portion thereby providing a support-engaging surface of substantial width outside of said springs.

In testimony whereof, I have signed my name to this specification.

FRED S. CARR.